United States Patent [19]
Romm et al.

[11] Patent Number: 5,485,932
[45] Date of Patent: Jan. 23, 1996

[54] WALL MOUNTABLE MODULAR COMPONENT MOUNTING SYSTEM

[75] Inventors: Michael Romm, Brighton; Robert A. Barker, Lunenburg; Stuart K. Morgan, Westford, all of Mass.

[73] Assignee: Digital Equipment Corporation, Maynard, Mass.

[21] Appl. No.: 237,517

[22] Filed: May 3, 1994

[51] Int. Cl.⁶ ........................... A47F 5/00
[52] U.S. Cl. ............... 211/87; 211/103; 248/214
[58] Field of Search .................. 211/87, 90, 103, 211/175, 182, 207; 248/231.91, 917; 403/363, 400, 387

[56] References Cited

U.S. PATENT DOCUMENTS

| | | | |
|---|---|---|---|
| D. 317,750 | 6/1991 | Bellomo et al. | D13/147 |
| 2,428,073 | 9/1947 | Handel | 211/87 |
| 2,858,265 | 10/1958 | Schneider | 204/297 |
| 2,858,266 | 10/1958 | Scheider | 204/297 |
| 3,142,386 | 7/1964 | Skubic . | |
| 3,156,282 | 11/1964 | Bedford, Jr. | 403/353 |
| 3,198,343 | 8/1965 | Pollock | 211/87 |
| 3,208,778 | 9/1965 | Gordon | 287/54 |
| 3,358,848 | 12/1967 | Johnsson | 211/177 |
| 3,499,672 | 3/1970 | Sunasky . | |
| 3,705,653 | 12/1972 | Pereyra | 211/13 |
| 3,881,829 | 5/1975 | James | 403/27 |
| 3,921,365 | 11/1975 | Nute, Jr. et al. | 52/758 A |
| 4,106,630 | 8/1978 | Rosenband | 211/191 |
| 4,138,019 | 2/1979 | Smith | 211/87 |
| 4,165,944 | 8/1979 | Sunasky | 403/254 |
| 4,549,665 | 10/1985 | Smitley | 211/191 |
| 5,148,353 | 9/1992 | Morgan et al. | 361/391 |
| 5,333,744 | 8/1994 | LoCircero et al. | 211/87 |

FOREIGN PATENT DOCUMENTS 1378230  10/1964  France .................. 211/182

OTHER PUBLICATIONS

U.S. Ser. No. 08/016,010 to LoCicero et al. filed Feb. 10, 1993.

Primary Examiner—Leslie A. Braun
Assistant Examiner—Catherine S. Collins
Attorney, Agent, or Firm—Ronald C. Hudgens; Arthur W. Fisher

[57] ABSTRACT

A wall or room partition mountable modular rail rack component mounting system. The system includes wall racks shaped for interlocking engagement with each other at their opposite ends and cross stiffener members for placement between the wall rails to hold them in rigid space apart relationship. The wall rails each having a shaped opening at one end and a mating element at the other end thereof. The shaped opening and the mating element interlock with each other. The dimensions and spacings of openings and elements on the wall rails and rail racks for mounting thereon provide for rail racks mounted in vertically aligned closely space relationship that gives uninterrupted rail rack placement.

7 Claims, 8 Drawing Sheets

5,485,932

WALL MOUNTABLE MODULAR COMPONENT MOUNTING SYSTEM

This invention relates to a modular component mounting system and more particularly to a rail rack modular component mounting system, especially useful for holding electronic components, suitable for mounting on a wall or room partition.

Communication centers include floor standing racks or cabinets holding active electronic components that can connect, for example, a number of personal computers into a local area network. These installations usually involve floor standing metal racks located within a "wiring closet" or some other out-of-the-way location, e.g., a utility room. Moreover, current rack type installations are expensive and require considerable space, not to mention the skilled labor required for installation and maintenance. By comparison, floor standing wiring cabinets are less expensive than "wiring closet" installations and can be placed in more convenient locations, such as hallways. Then too, they are far less labor intensive to install and maintain. But in the past the large size of communications boxes and the complexity of wiring cabinet type installations have made them only an interim solution. Miniaturization of components and other factors, such as space requirements, have accelerated a trend toward the use of small, distributed-wiring centers.

Prior modular component mounting systems have tried to meet the opportunities in space savings and to meet reduced installation and maintenance expense as a result of component miniaturization. But there remains unmet needs. Prior modular mounting systems have tended to be plate mounted systems that are product specific. As a consequence, there is a need for a generic type modular system capable of handling a variety of sizes and types of electronic equipment in "wiring closets" and office spaces and capable of expanding as system equipment is added.

SUMMARY OF THE INVENTION

An object of the invention is generic modular component mounting system.

Another object of the invention is a wall mountable modular rack rail component mounting system.

Yet another object of the invention is modular rack rail component mounting system that is compact and space saving by providing uninterrupted rail rack mounting.

Still another object of the invention is a modular rack rail component mounting system suitable for expansion.

These and other objects are obtained by a wall mountable modular rail rack component mounting system including wall rails configured for interlocking engagement with each other at their opposite ends and cross stiffener members for placement laterally between the rails to hold the rails in rigid spaced apart relationship. Each of the rails of the system includes at one end a configuration including a shaped opening for hanging/mounting and a mating element at the other end. The hanging/mounting opening at one end of one rail interlocks with the mating element at the other end at the other end of another rail. The dimensions and spacings of openings and elements on the wall racks and the rail racks provide for rail racks mounted in vertically aligned closely spaced relationship that gives uninterrupted rail rack placement.

The wall mountable modular rack rail component mounting system of the instant invention provides a number of advantages. It is generic in its approach by allowing the system to grow as the need for more mounted components arises or the size of the components changes. Further, because the system provides for uninterrupted or continuous rack rail mounting, the system saves space by mounting components in a more compact way. Moreover, because the components of the system interlock, the system is easy to assemble and maintain. Consequently, installation labor and maintenance costs are low. Then too, the system is cheaper to ship and easier to handle because of the small unassembled volume of its components.

Then too, the instant wall mountable system can be useful in a variety of other office and home mounting and storage capacities.

Other objects and advantages of the invention will become apparent as the invention is hereinafter described in more detail with reference made to the following drawings.

DESCRIPTION OF THE PREFERRED EMBODIMENTS

Figure 1:
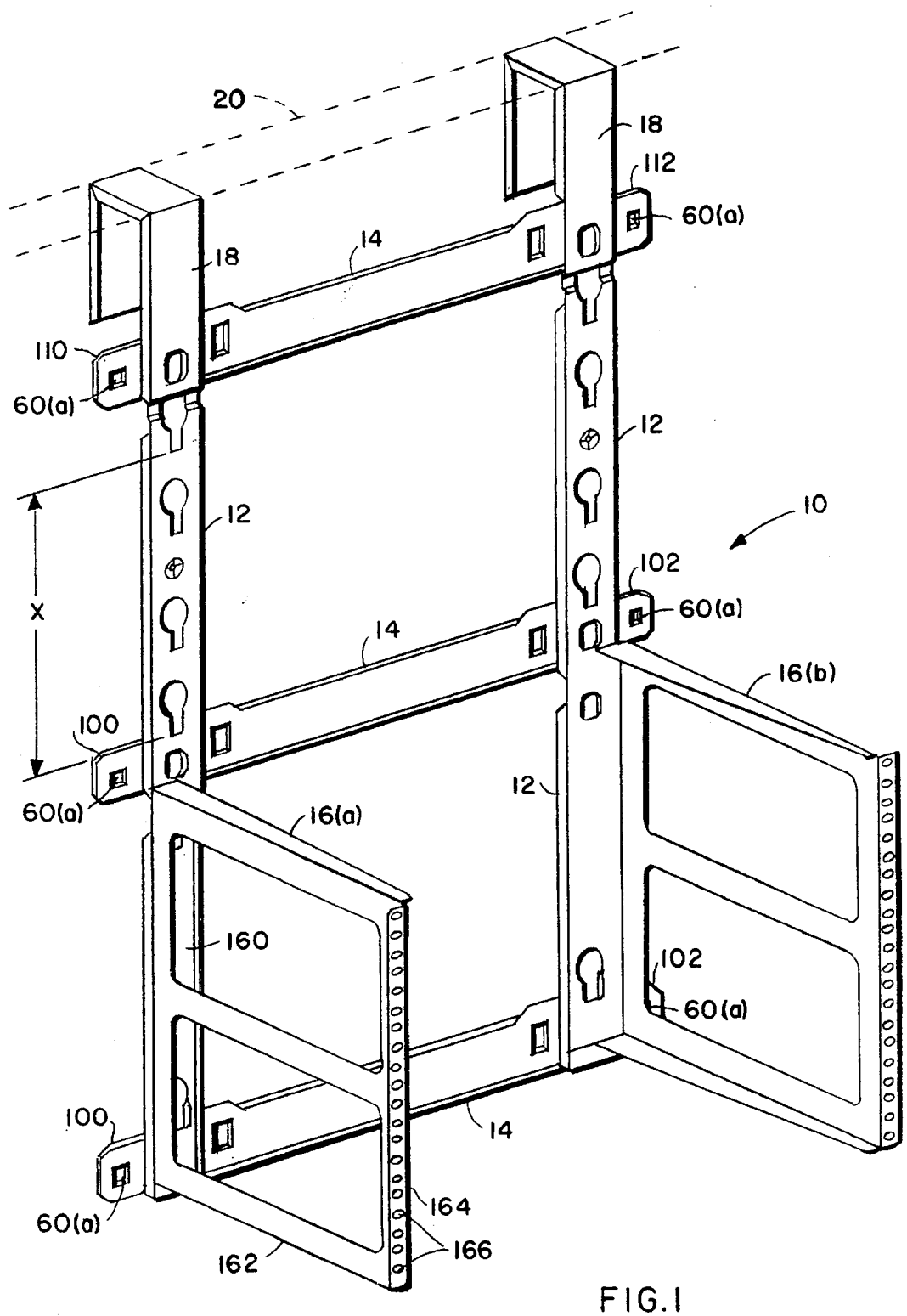
FIG. 1 is a perspective view of a wall mountable modular component mounting system according to the principles of the invention mounted on a room partition by partition hangers. The system is shown with a pair of rail racks in component mounting position.
Figure 2:
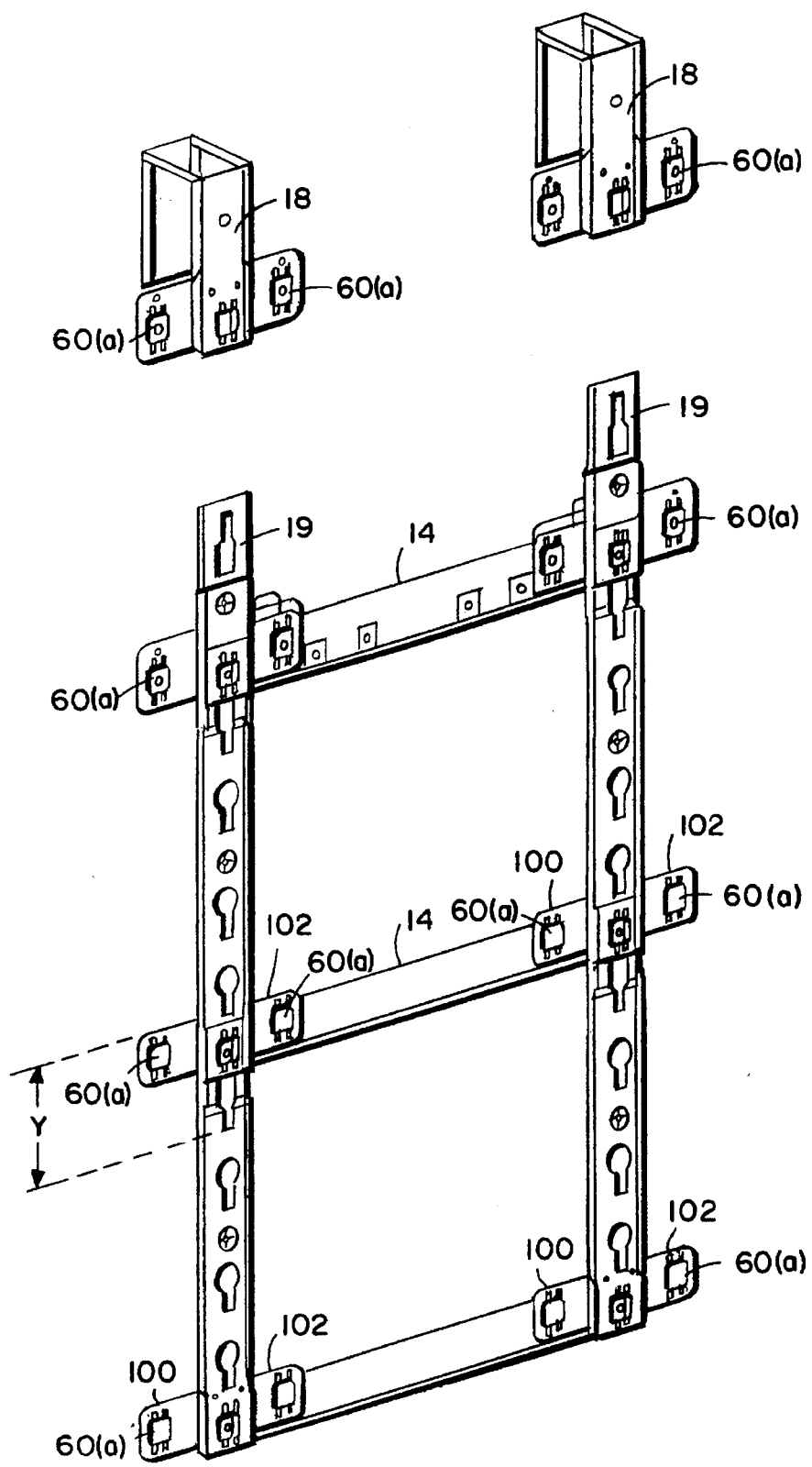
FIG. 2 is a perspective view of the wall mountable modular component mounting system of FIG. 1, but without the rail racks. Also, wall mounts are shown in place; partition hangers are shown above in somewhat of an exploded view manner.

FIGS. 1 and 2 show a modular component mounting system 10 according to the principles of the invention. As shown, the system 10 includes two pairs of vertically oriented identical metal wall rails 12 interlocked at their opposite ends, horizontally oriented metal cross stiffener members 14 connecting the rails 12 in interlocking fashion, and two metal rack rails 16(a) and 16(b) (FIG. 1) are shown interlocked in mounted position on the lower rails 12 in position to receive an electronic component, such a router and bridges or patch panels. The system 10 is shown in FIG. 1 mounted or hung by metal partition hangers 18 on a room partition 20, indicated in dashed lines. FIG. 2 shows wall mounts 19 in mounting position and the partition hangers 18 are indicated above the system 10 out of mounting position. Additional wall racks 12 can be used as circumstances demand.

Figure 3:
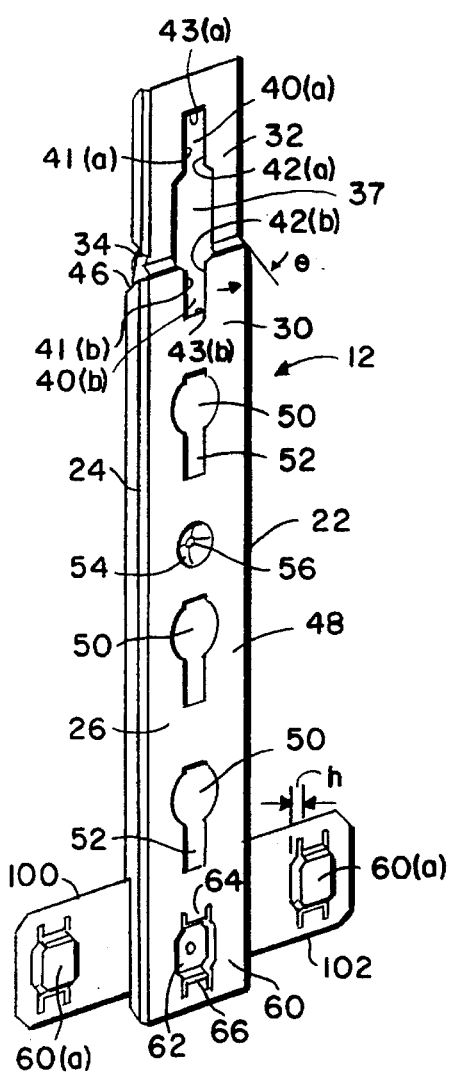
FIG. 3 is a perspective view of one of the rails shown in FIGS. 1–2. The rail is shown with two laterally extending mounting brackets at its lower end.
Figure 4:
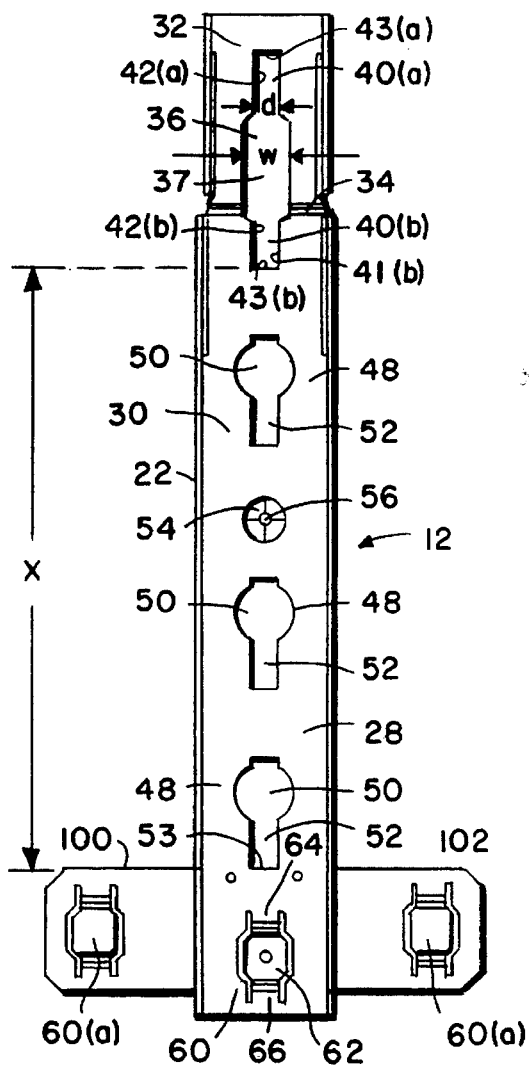
FIG. 4 is a rear elevation view of the rail shown in FIGS. 1–3.
Figure 5:
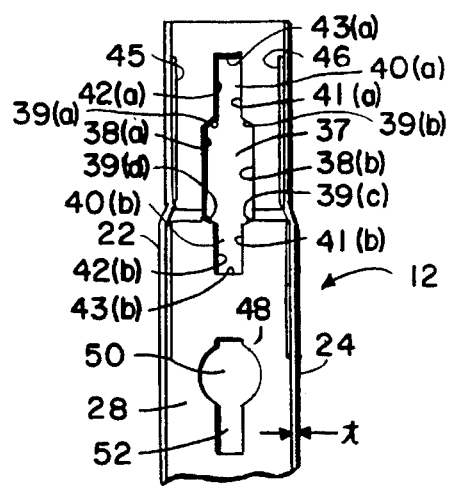
FIG. 5 is a rear elevation view of a portion of the upper end of the rail shown in FIGS. 1–4.

FIGS. 3–5 are enlarged showings of one of the wall rails 12 made of sheet steel that has a thickness "t" (see FIG. 5) of 0.060 of and inch. While the rail 12 and other components of the system 10 are made of sheet steel of the same thickness "t", other thicknesses can be used. Moreover, components can be made of other rigid material—such as plastic.

Each of the rails 12 is configured in such a manner at its ends that rails 12 an. interlock with each other at opposite ends. As shown, rail 12 includes an elongated central portion 22 and an upstanding wall portion 24 at each of the longitudinal edges of the central portion 22. The upstanding wall portions 24 extend away from the elongated central portion 22 on the same side of the rail 12 and as shown, the wall portions 24 have free upper edges that terminate in the same plane. The wall portions 24 keep the central portion 22 in spaced apart relationship with a wall on which the system 10 is mounted.

The central portion 22 has opposing major surfaces 26 and 28 (see FIG. 5). The major surface 26 is on the side of the rail 12 (central portion 22) opposite the upstanding wall portions 24 and is the outwardly facing surface when the system 10 is mounted on a wall; the major surface 28, the inward wall facing surface when the system 10 is mounted on a wall.

The outwardly facing surface 26 includes a main surface portion 30, an end surface portion 32 that is narrower in width than the main surface portion 30, and a transition surface portion 34. The end surface portion 32 terminates one end of the rail 12. The end surface portion 32 extends in a direction parallel to the main surface portion 30 and is laterally offset therefrom a distance substantially equal to the thickness dimension "t" of the sheet steel. The offset is in a direction that places the main surface portion 30 further from a wall than the end surface portion 32 when the rails 12 of the system 10 are mounted on a wall.

The transition portion 34 is relatively short and connects the adjacent ends of the offset end surface portion 32 and the main surface portion 30. As a result, the transition surface portion extends in inclined relationship with the portions 30 and 32. The angle of inclination, shown as θ in FIG. 3, is 45 degrees, but can be inclined at different angles under other circumstances, such as between 45 and 90 degrees. Under some circumstances an inclination angle θ of 90 degrees can conveniently be used.

As shown in the drawing, there is an elongated hanging/mounting opening 36 through the rail 12 at its upper end. The opening 36 is shaped to include an elongated central space 37 extending lengthwise on the longitudinal axis of the rail 12 and having a width "w" (see FIG. 4) and aligned rectangular mating or hanging slot 40(a) and rectangular mounting slot 40(b) of the same size communicating with the central space 37 at opposite sides of such space. As shown, the central space 37 is generally rectangular in shape and defined by spaced apart parallel side edges 38 (a) and 38 (b) and slant edges 39 (a), 39 (b), 39 (c), and 39 (d) each forming an angle α of 60 degrees (see FIG. 8) its associated side edge (and longitudinal axis of rail 12), although other angles may be used. As illustrated, the hanging slot 40 (a) is defined by spaced apart parallel side edges 41 (a) and 42 (a) and end edge 43 (a); the mounting slot 40 (b), by spaced apart parallel side edges 41 (b) and 42 (b) and end edge 43(b). The pairs of side edges 41 (a) and 42 (a), and the pairs of side edges 41 (b) and 42 (b) are both separated by a width distance "d" (see FIG. 4) that is smaller in dimension than the width dimension "w" of the central space 37. While the central space 37 is shown as rectangular, it can be other shapes, such as a square, an oval, or a circle.

As illustrated, the hanging slot 40 (a) is situated entirely in the end surface portion 32 and the mounting slot 40(b) is situated entirely in the main surface portion 30. The central space 37 is located in all the surface portions 30, 32, and 34. The parallel side edges 38(a) and 38(b) extend in the end surface portion 32, run across the transition surface portion 34, and terminate at the upper side of the transition surface portion 34. The slant edges 39 (c) and 39(d) are located in the main surface portion 30.

Figure 6:
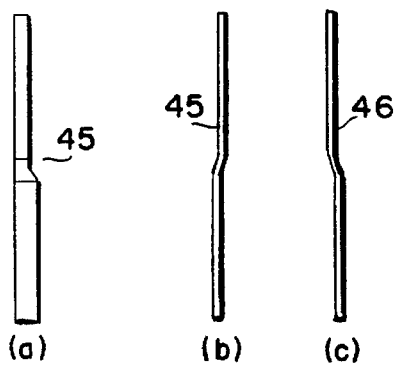
FIGS. 6(a), 6(b), and 6(c) are various showings of rail stiffeners used with the rails shown in FIGS. 1–5.

FIGS. 6(a)–6(b) show metal rail stiffeners 45 and 46, which are used on the rail 12 at the wall portions 24 to span between the surface portions 30, 32, and 34. As illustrated, the stiffeners 45 and 46 are welded to the inside of wall portions 24.

The elongated central portion 22 of the rail 12 has mating keyhole shaped openings 48 spaced apart along its longitudinal axis. These holes 48 are for interlock mounting rack rails 16 on rails 12 and each includes a circular part 50 and a slot 52 communicating with the circular part 50. As shown, the slots 52 are the same size as the slots 40 (a) and 40 (b). The elongated central portion 22 of the rail 12 also includes a circular recess 54 with a hole 56 for screw fasting to a wall.

The other end of the rail 12 from the end surface portion 32 includes an inwardly extending mating elements 60 located on the longitudinal axis of the rail 12 that includes a platform plate 62 and generally rectangular shaped arms 64 and 66. The arms 64 and 66 are curved to hold the plate 62 in spaced apart relation with respect to the main surface portion 30 of the inward wall facing surface 28. The span of the plate 62 "s" (see FIG. 8) is greater than the width dimension "d" separating the side edges 41 and 42 of the slots 40 (a) and 40 (b). The portion of the plate 62 that extends outwardly of the width of the arms 64 and 66 forms wings or wing portions (designed as "wings" in FIG. 8) that have the same span "s" as the plate 62. Because the wings of the plate 62 on one rail 12 mate with the edge regions of another rail 12 at slot 40(a), the distance or height "h" (see FIG. 2) of the underside surface of the plate 62 from the inward wall facing surface 28 must be enough greater than the thickness "t" to allow interlocking of the wings of one rail 12 with the material at the edges 41 and 42 of the slot 40 (a) of another rail 12.

As discussed in more detail hereinafter, the members of the system 10 include additional mating elements 60 identical to the mating element 60 just described, except some of the elements are formed on the outwardly facing surface side of a member 60(a); some of the elements are formed on the inwardly facing surface of the member 60. It may be advantageous at times to use wings of various sizes and heights with slots of different widths.

The end surface portion 32 of the rail is sufficiently narrower in width than the width of the other end of the rail 12 to allow the inward wall facing surface 28 of the other end of one of the rails 12 to be placed in contact with the end surface portion 32 of another rail 12 so that the interlocking between the inwardly extending mating element 60 and the edge regions of a slot 40(a) can take place. When two rails 12 are in interlocking relationship, the upstanding wall portions 24 at the other end of a rail 12 with the inwardly extending mating element 60 are located in an outside immediate adjacent relationship with the upstanding wall portions 24 at the end surface portion end of the other rail 12.

Figure 8:
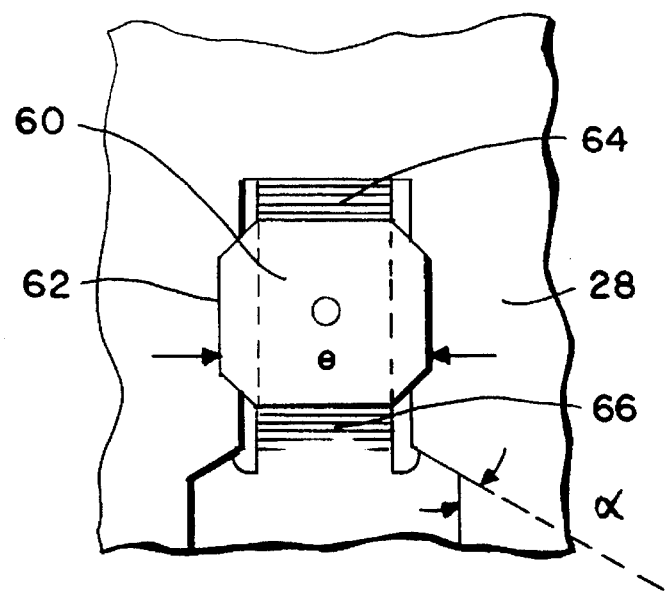
FIG. 8 illustrates the mating opening and elements of FIG. 7 in interlocking engagement.
Figure 7:
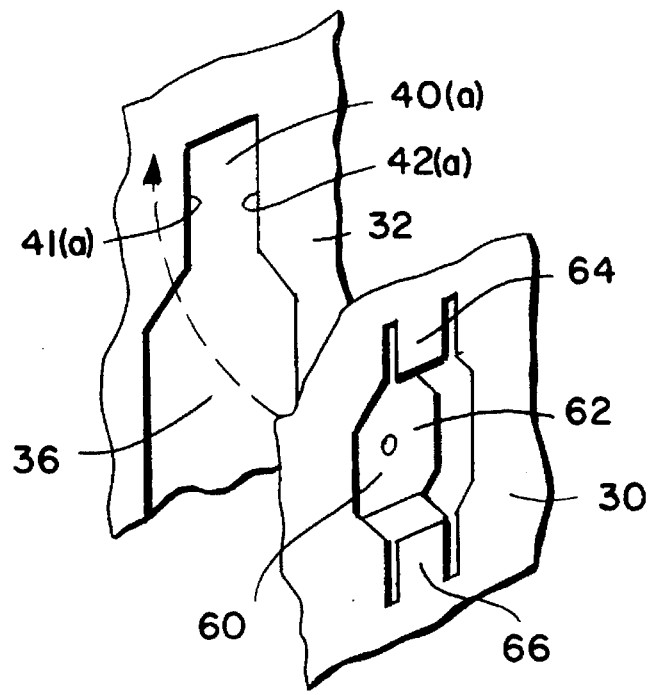
FIG. 7 is a perspective view of a portion of opposite ends of two rails shown in FIGS. 1–5 indicating movement to bring the mating element of one of the rails into interlocking engagement with the mating opening of another rail.

FIG. 7 illustrates movement between opposite ends of two rails 12 to bring an inwardly extending mating element 60 on one of the rails 12 into interlocking engagement with the edges of a slot 40(a) in a second rail 12. As indicated, the plate 62 moves through the central space 37 of the opening 36. The two rails are moved relative to each other so that the plate 62 moves into the slot 40 (a) to establish an interlocking relationship between the plate 62 (wings) and the material of the rail 12 at the edges 41 (a) and 41 (b) of FIG. 8 illustrates interlocking engagement between inwardly extending mating element 60 and slot 40(a).

Patent application Ser. No. 08/016,010, which discloses fastening between mating elements like mating element 60 and a mating slot, is hereby specifically incorporated herein by reference.

Figure 9:
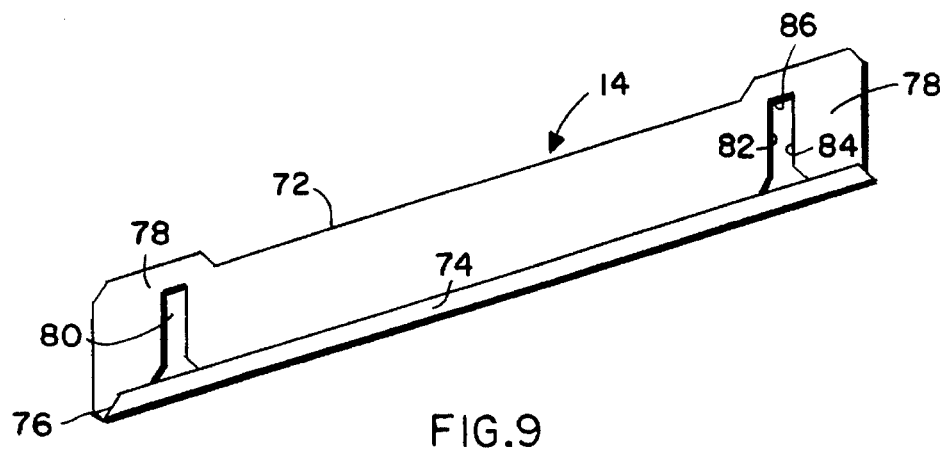
FIG. 9 is a perspective view of a cross member stiffener shown in FIGS. 1–2.
Figure 10:
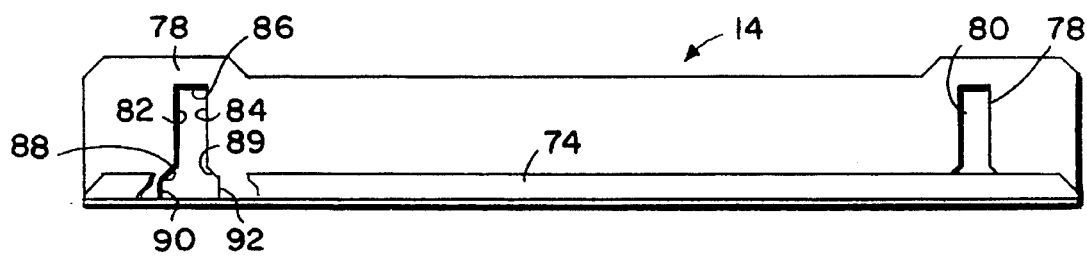
FIG. 10 is a front elevation view, partly in cut away section, showing the cross member stiffener of FIG. 9. The cut away section is made to more clearly show the mating slot of the cross member stiffener.
Figure 11:
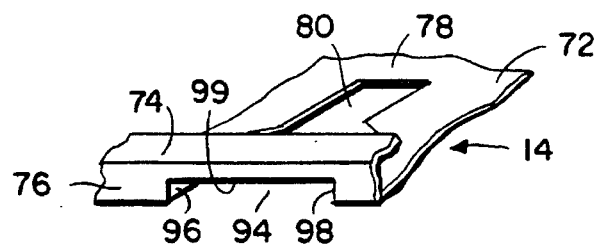
FIG. 11 is a perspective view from the bottom of the cross member stiffener of FIGS. 9–10.

FIGS. 9–11 show the cross stiffener member 14 that includes a main portion 72, a lower channel portion comprising a lip 74 and a bottom 76, and two openings 78, one formed at each of the ends of the member 14. Each of the two opening 78 includes a slot 80 defined by parallel spaced apart side edges 82 and 84 [spaced apart the same distance and the distance "d" as the side edges 41 and 42 of the slots 40(a) and 40 (b) ] and end edge 86. Each of the openings further includes an entrance region defined by slant edges 88 and 89, parallel spaced apart edges 90 and 92, and an entrance slot 94 in the bottom 76 defined by end edges 96 and 98 and side edge 99 (see FIG. 11). The end edges 96 and 98 of the slot 94 are greater in dimension than the thickness "t" of the material of rail 12 to allow the platform plate 62 of an inwardly extending mating element 60 of another member or rail to move through the entrance region of the opening 78 for mating engagement with the edge regions of slot 80.

The slots 80 of the rail cross stiffener member 14 interlock with the inwardly extending mating element 60 carried by laterally extending mounting brackets 100 and 102 (see FIGS. 1–5) of the rails 12. To interlock them end rail stiffener 14 and rail 12 are moved relative to each other to move plate 62 through slot 94 and entrance region to bring the plate into slot 80. The wings of the plate 62 interlock with the material at the edge regions of slot 80 in a manner similar to what is shown in FIG. 8 in connection with interlocking the opposite ends of rails 12.

Cross stiffener members 14 of different lengths can be used as circumstances demand.

Figure 12:
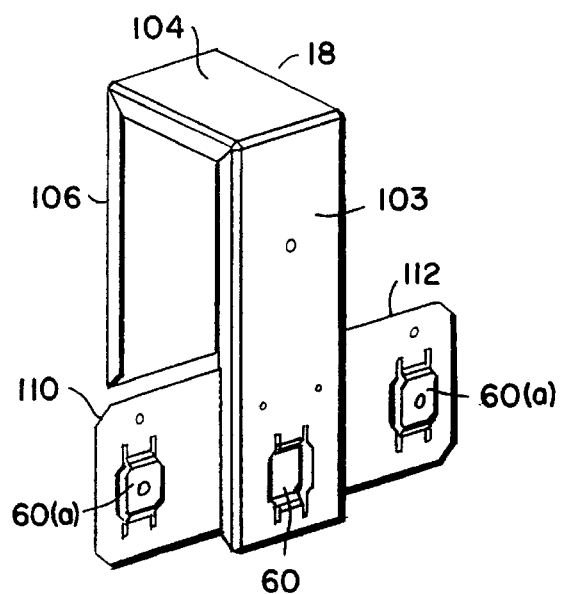
FIG. 12 is a perspective view of the partition hanger mount shown in FIGS. 1 and 2.

FIG. 12 shows the partition hanger 18 that is generally U-shaped and includes a front wall 102, a top 104, and a rear wall 106 shorter in length than the front wall 102. The front wall includes laterally extending mounting brackets 110 and 112, which each includes an outwardly facing mating element 60(a) for interlocking engagement with a cross stiffening member in a slot 80. Additionally, at the bottom of the front wall 102 there is included an inwardly facing mating element 60 for interlocking engagement with a rail 12 in slot 40(a) of opening 36.

Figure 13:
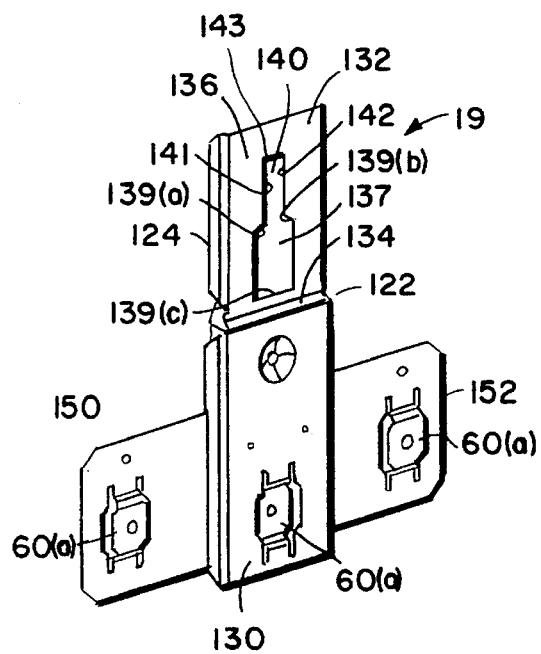
FIG. 13 is a perspective view of the wall hanger mount shown in FIG. 2.
Figure 14:
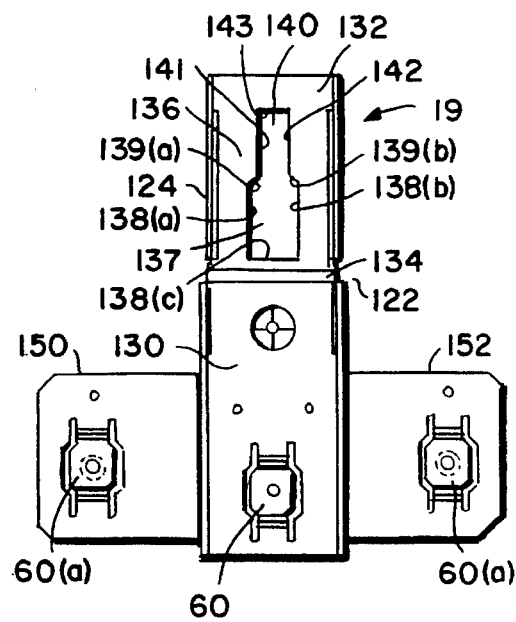
FIG. 14 is a rear elevation view of the wall hanger mount shown in FIGS. 2 and 13.

FIGS. 13 and 14 show the wall hanger 19 that is generally I-shaped and is configured identically to the upper end of rail 12 as viewed in FIGS. 1–4. The hanger 19 includes an elongated central portion 122 and upstanding wall portions 124 at each of longitudinal edges of the central portion 122. The wall portions 124 extend away from the central portion 122 on the same side of the hanger 19. The central portion 122 has opposing major surfaces: an outwardly facing surface 126 when the system 10 is mounted on a wall and an inward wall facing surface (not shown) when the system 10 is mounted on a wall. The outwardly facing surface 126 includes a main surface portion 130 that has the same width dimension as the main surface portion 30, an end surface portion 132 that is the same width and length dimensions as the end surface portion 32 of the rail 12, and a transition surface portion 134 that is the same width and length dimensions as the transition surface portion 34. The end surface portion 132 extends in a direction parallel to the main surface portion 130 and is laterally offset therefrom a distance substantially equal to the thickness dimension "t". And the transition surface portion 132 extends in inclined relationship with the portions 130 and 134. The angle of inclination can vary like the angle of inclination θ shown in FIG. 3 and discussed in connection with rail 12.

The end surface portion 132 of the hanger 19 includes an opening 136 similar to the opening 36 in the rail 12. The opening 136 is shaped to include a generally rectangular space 137 extending lengthwise along the longitudinal axis of the hanger 19 and having a width dimension that is the same as the width dimension "w" of the central space 37. The space 137 is located entirely in the end surface region 132 and is defined by spaced apart parallel side edges 138(a) and 138(b), end edge 138(c), and slant edges 139(a) and 139(b). The opening 136 further includes a generally rectangular slot 140 communicating with the upper side of the space 137 that extends lengthwise along the longitudinal axis of the hanger 19. The slot 140 is located entirely in the end surface portion 132 and is defined by spaced apart parallel side edges 141 and 142 and end edge 143. The width dimension of the slot 140 is the same as the width dimension "d" of the slots 40 (a) and 40(b) of rail 12.

Hanger 19 further includes laterally extending mounting brackets 150 and 152, which each includes an outwardly facing mating element 60(a) for interlocking engagement with a cross stiffening member 14. Additionally, at the bottom of the hanger 19 there is an inwardly facing mating element 60 for interlocking engagement with a rail 12 in slot 40 (a) of the opening 36.

Figure 15:
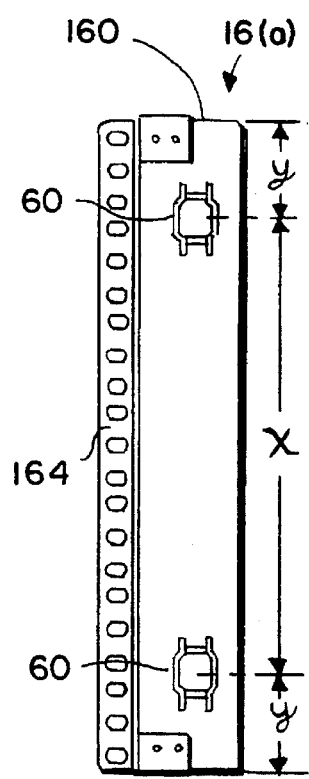
FIG. 15 is a front elevation view of the left rail rack shown is FIG. 1.
Figure 16:
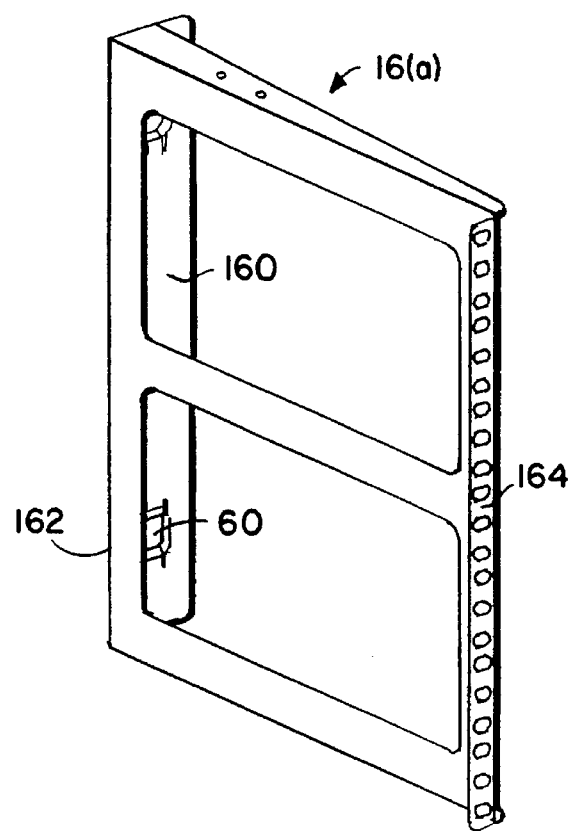
FIG. 16 is a perspective view of the left rail rack shown in FIGS. 1 and 15.

FIGS. 15 and 16 show the left rail rack 16(a), which includes a back member 160, a side member, and a mounting flange 164 having mounting openings 166. As shown, the back member 160 and mounting flange 164 extend at right angles laterally away from the side member 160 on opposite sides thereof. The back member includes spaced apart inwardly facing mating members 60 at opposite ends thereof for interlocking engagement with mounting slot 40 (b) of the hanging/mounting opening 36 and with the mounting slot 52 of the opening 48 to mount the rail rack 16(a) on a rail 12 of the system 10. As shown, the distance "x" (see FIG. 15) between the mid-region or center of the platforms 62 of the inwardly extending mating elements 60 on back member 160 equals the distance "X" (see FIGS. 1 and 4) between the end edge 43(b) of the mounting slot 40 (b) and the end edge 53 of the opening 48. Hence, when the wings of the back member 160 are positioned to extend through the mounting opening 48 and hanging/mounting opening 38, a rail rack 160 and a wall rail 12 can move relative to each other to mount the rail rack 160 thereon by establishing an interlocking relationship between the wings and the mounting slots of the wall rail 12.

Figure 17:
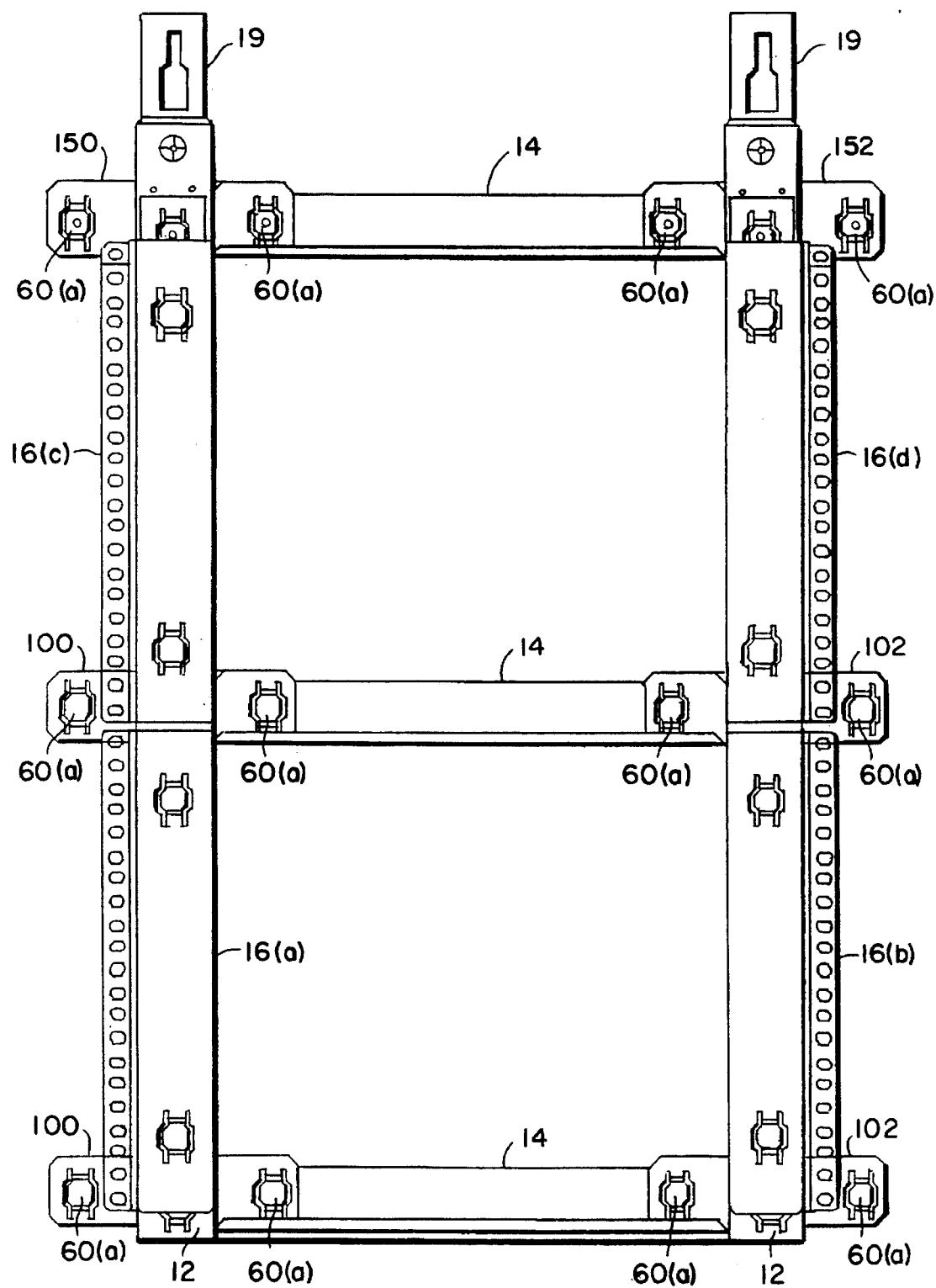
FIG. 17 is a front elevation view of the modular component mounting system of FIG. 1 with a second set of rail racks in component mounting position.

The component mounting system 10 includes uninterrupted vertically aligned mounting of rail racks 16. This feature is illustrated in FIG. 17, which shows the system 10 with four mounted rail racks-racks 16(a), 16(b), 16(c), and 16(d). This closely spaced vertical relationship is accomplished by the relationship between the mounting openings of rails 12 and the location of the inwardly extending mating elements 60 of the side member 160. The distance between the end edge 53 of the bottom mounting slot 52 of one rail 12 and the end edge 43(b) of the hanging/mounting opening 36 of a second interlocked rail 12 (shown as "Y" in FIG. 2) is twice the distance between the mid-region of the inwardly extending mating elements 60 of rail rack 160 and its associated rail rack end (shown as "y" in FIG. 15).

While the wall rails 12, the partition hangers 18, and wall mounts 19 are all shown with double mounting brackets, e.g., brackets 100, 102,110, and 112, variations can be made as circumstances demand. For example, single brackets can be used, e.g., only bracket 102 in the case of rails 12. The outside rail 100 is used for outside mounting to add more rails 12 or to mount covers or enclosures on the system 10.

It is apparent that, within the scope of the invention, modifications and different arrangements may be made other than those disclosed herein, and the present disclosure is illustrative merely, the invention comprehending all variations thereof.

We claim:

1. A wall mountable modular component mounting system comprising:

wall rails each made of rigid material having a thickness dimension "t" and configured for interlocking engagement with each other at opposite ends, each rail comprising an elongated central portion and an upstanding wall portion at each of the longitudinal edges of such elongated central portion, the upstanding wall portions extending away from the elongated central portion on the same side of the rail to maintain such central portion in spaced apart relationship with a wall on which the system is mounted, the central portion having opposing elongated major surfaces, the elongated major surface on the side of the rail opposite the upstanding wall portions being outwardly facing surface when the system is mounted on a wall and the other major surface being inwardly wall facing surface, the outwardly facing surface including a main surface portion, an end surface portion narrower in width than the main surface portion, and a transition surface portion, the end surface portion terminating one end of the rail, such end surface portion being parallel to and laterally offset from the main surface portion a distance substantially equal to the thickness dimension "t" in a direction placing the main surface portion further from a wall than the end surface portion when the system is mounted on a wall, the adjacent ends of the end surface portion and of the main surface portion being connected by the transition surface portion, such transition portion extending in inclined relationship with the main and end surface portions, the rail having a hanging/mounting opening through the rigid material at the end of the rail having the end surface portion, such opening being shaped to include a central space with a width dimension "w" and a generally rectangular hanging slot aligned with a mounting slot, the central space extending lengthwise of the rail in the end surface portion and across the transition surface portion, each of the aligned slots being defined by two generally parallel side edges separated by a distance "d" that is smaller in dimension than the width dimension "w" of the central space and an end edge, the aligned slots being in communication with the central space on opposite sides thereof and extending lengthwise of the elongated central portion with the mounting slot being located entirely in the main surface portion and the hanging slot being located entirely in the end surface portion, a pair of wings of rigid material having a thickness dimension "t" located at the other end of the rail, the wings being mounted on the rail in spaced apart parallel relationship with the inwardly wall facing surface to define two generally parallel channels extending lengthwise of the elongated central portion, the channels each having a height dimension "h" greater than the thickness dimension "t" and the wings having a span dimension "s" greater than the distance dimension "d", the end surface portion of each of the rails being sufficiently narrower in width than the width of the other end of each of the rails to allow the inwardly wall facing surface at the other end of a first rail to be placed in contact and in an interlocking position with the end surface portion of a second rail with the upstanding wall portions of the other end of the first rail having its wings located in an immediately outside adjacent relationship with the upstanding wall portions of the end surface portion of the second rail, the wing extending through the central opening of the second rail to the inwardly wall facing surface side of the first rail for movement of the rails relative to each other to establish an interlocking relationship between the wings of the first rail and rigid material of the second rail defining the hanging slot.

2. The wall mountable modular component mounting system of claim 1 wherein the hanging slot and the mounting slot are different lengths.

3. The wall mountable modular component mounting system of claim 2 wherein the central space of the hanging/mounting opening is defined by slant edges at each of its of its corner regions.

4. The wall mountable modular component mounting system of claim 1 wherein the central space of the hanging/mounting opening is on the longitudinal axis of the rail.

5. The wall mountable modular component mounting system of claim 1 further including:

a mounting bracket at the other end of each of the rails, such bracket laterally extending from the rail and having formed thereon a pair of wings of rigid material having a thickness dimension "t", the wings being mounted in spaced apart parallel relationship with the inwardly facing surface of the bracket; and a cross stiffener member including a longitudinal main portion and a lower channel portion comprising a lip and a bottom, the main portion having an opening at each end that includes a slot extending transverse of the main portion and an entrance slot in the bottom that is in communication with the slot in the main portion, the entrance slot being so dimensioned as to allow the wing on the mounting bracket to move therethrough and move into the slot in the main member, the span "s" of the wings is greater than the width of the slot in the main member so as to establish an interlocking relationship between the wings and rigid material of the rail at the edges of the rail defining the slot in the main member.

6. The wall mountable modular component mounting system of claim 1 further including a rail rack and wherein the main surface portion of each of the wall rails has a rack mounting opening in spaced apart relationship with the hanging/mounting opening, the rack mounting opening including a generally rectangular rack mounting slot in communication with a larger rack mounting space, the rack mounting slot being defined by parallel side edges separated by a distance "d" and an end edge, the rack mounting slot extending lengthwise of the main surface portion and aligned with the mounting slot of the hanging/mounting opening, the rail rack including a generally rectangular back member and side member, the back member having formed at each end thereon a pair of wings of rigid material having a thickness dimension "t", the wings of the back member being mounted in spaced apart parallel relationship with the inward wall facing surface of the back member when the system is mounted on a wall, the distance between the wings of the rail rack being equal to the distance on each wall rail between the hanging/mounting opening and rack mounting opening, the wings of the back member having a span "s" that is greater than the width of the rack mounting slot and the wall rail mounting slot so that when the wings of the back member and a wall rail are positioned with respect to each other with one of the wings of the back member extending through the central space of the hanging/mounting opening and the other of the wings of the back member extending through the larger rack mounting space of the rack mounting opening of the rail rack and a wall rail can move relative to each other to mount the rail rack on the wall rail by establishing an interlocking relationship between the wings of the back member and the slots of the wall rail.

7. The wall mountable modular component mounting system of claim 6 further including a second rail rack identical to the rail rack and wherein on each wall rail the location of the end edge of the mounting slot of the hanging/mounting opening and the location of the end edge of the rack mounting slot are such that when the wall rails are interlocked at opposite ends the distance between such slot end edges is equal to twice the distance between each pair of rail rack wings and its associated back member end so that when the rail racks are mounted on the interlocked wall rails the rail racks are vertically aligned in closely spaced relationship.

* * * * *